(12) United States Patent
Oseto

(10) Patent No.: US 7,614,972 B2  
(45) Date of Patent: Nov. 10, 2009

(54) BICYCLE REAR DERAILLEUR

(75) Inventor: Shinya Oseto, Sakai (JP)

(73) Assignee: Shimano Inc., Osaka (JP)

( * ) Notice: Subject to any disclaimer, the term of this patent is extended or adjusted under 35 U.S.C. 154(b) by 361 days.

(21) Appl. No.: 11/563,775

(22) Filed: Nov. 28, 2006

(65) Prior Publication Data

US 2008/0125258 A1 May 29, 2008

(51) Int. Cl.  
*F16H 59/00* (2006.01)

(52) U.S. Cl. ............................................ 474/82; 474/80

(58) Field of Classification Search .................. 474/80, 474/82; F16H 59/00  
See application file for complete search history.

(56) References Cited

U.S. PATENT DOCUMENTS

| | | | | |
|---|---|---|---|---|
| 4,235,118 A | * | 11/1980 | Huret | ............... 474/82 |
| 4,494,944 A | * | 1/1985 | Coue | ............... 474/82 |
| 4,690,663 A | | 9/1987 | Nagano | |
| 4,731,046 A | * | 3/1988 | Juy | ............... 474/80 |
| 5,498,211 A | | 3/1996 | Hsu | |
| 6,350,212 B1 | | 2/2002 | Campagnolo | |
| 6,607,457 B2 | * | 8/2003 | Kawakami | ............... 474/80 |
| 6,685,586 B2 | | 2/2004 | Dal Pra' | |
| 2002/0187867 A1 | * | 12/2002 | Ichida et al. | ............... 474/82 |
| 2006/0194660 A1 | | 8/2006 | Shahana | |

FOREIGN PATENT DOCUMENTS

| | | |
|---|---|---|
| DE | 1 206 748 | 12/1965 |
| DE | 100 17 140 A1 | 11/2000 |
| FR | 2 652 329 | 3/1991 |
| FR | 2 699 137 | 6/1994 |
| TW | 145728 | 11/1990 |
| TW | 182226 | 4/1992 |

* cited by examiner

*Primary Examiner*—Bradley T King  
*Assistant Examiner*—Stephen Bowes  
(74) *Attorney, Agent, or Firm*—Global IP Counselors, LLP

(57) ABSTRACT

A bicycle base member adjustment assembly is provided for a base member of a rear derailleur. The bicycle base member adjustment assembly basically has a base member stopper plate, a biasing force adjustment member and a biasing force adjusting element. The biasing force adjusting element is operatively coupled between the base member stopper plate and the biasing force adjustment member to selectively set a relative angular position of the biasing force adjustment member relative to the base member stopper plate about a rotational axis of the base member. The base member stopper plate has a stopper that limits movement of the base member of the rear derailleur relative to the base member stopper plate. The biasing force adjustment member engages a biasing element of the base member of the rear derailleur. When the biasing force is adjusted, the position of the base member stopper plate is not changed.

2 Claims, 8 Drawing Sheets

BICYCLE REAR DERAILLEUR

BACKGROUND OF THE INVENTION

1. Field of the Invention

This invention generally relates to a bicycle rear derailleur. More specifically, the present invention relates to a bicycle base member adjustment assembly that adjusts the biasing force of the biasing member of the base member and limits pivotal movement of the base member of the bicycle rear derailleur relative to the bicycle frame.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle rear derailleur.

A bicycle rear derailleur is used to selectively engage a chain with one of a plurality of sprockets that rotate with the rear wheel of the bicycle. A typical rear derailleur comprises a base member, a movable member supporting a chain guide and a pair of links coupled between the base member and the movable member so that the chain guide moves laterally relative to the base member. The base member usually is mounted to the rear end of the bicycle frame by a mounting bolt that screws into a threaded opening formed in the rear end of the bicycle frame. The rear derailleur may include a stopper plate rotatably mounted to the mounting bolt, with a first stopper member arranged to contact an abutment formed on the frame end to limit counterclockwise rotation of the base member relative to the frame (when viewed from the outbound side of the rear derailleur). Moreover, some of these rear derailleurs are further spring biased in a clockwise direction relative to the stopper plate. In this case, one end of a torsion spring is attached to the base member, and another end of the torsion spring is attached to the stopper plate. The stopper plate includes a second stopper member that contacts an abutment formed on the base member to limit clockwise rotation of the base member relative to the stopper plate caused by the torsion spring. Often, an adjusting bolt that screws into the first stopper member to contact the abutment formed on the frame end. Turning the adjusting bolt adjusts the rotational position of the stopper plate relative to the frame end and thereby adjusts the tension of the torsion spring for a given rotational position of the base member. Such a derailleur is disclosed in U.S. Pat. No. 4,690,663 (assigned to Shimano, Inc.).

During bicycle assembly, one end of an operating cable is typically connected to one of the links, and another end of the operating cable is connected to a shift control device mounted on the bicycle handlebar. When the rider operates the shift control device, the operating cable is pulled or released accordingly. The operating cable pulls or releases the link, which causes the link to pivot relative to the base member and move the chain guide laterally to shift the bicycle chain from one rear sprocket to another rear sprocket.

Since the torsion spring biases the base member in the clockwise direction, rotation in the counterclockwise direction is inhibited even when riding over rough terrain that subjects the bicycle to severe bouncing motion. As a result, the chain guide and the movable member are less prone to striking the frame, thereby minimizing the risk of damage to the chain guide and to the bicycle frame. However, since the rotational position of the stopper plate relative to the frame also sets the initial rotational position of the base member relative to the frame, adjusting the rotational position of the stopper plate to set the desired biasing force of the torsion spring may alter the initial position of the base member to an undesirable position. For example, the altered position may increase the possibility of the chain guide striking the frame during rough riding.

In view of the above, it will be apparent to those skilled in the art from this disclosure that there exists a need for an improved rear derailleur that includes a stopper member configuration that does not require a widened base member and elongated mounting axle. This invention addresses this need in the art as well as other needs, which will become apparent to those skilled in the art from this disclosure.

SUMMARY OF THE INVENTION

One object of the present invention is to provide a bicycle base member adjustment assembly that adjusts a biasing force of a biasing element of the base member of the rear derailleur without changing the positions of the base member stopper plate with respect to the rear end of the bicycle frame.

In accordance with one aspect of the present invention, a bicycle base member adjustment assembly is provided for a base member of a rear derailleur. The bicycle base member adjustment assembly basically comprises a base member stopper plate, a biasing force adjustment member and a biasing force adjusting element. The base member stopper plate includes a first adjustment part, and a stopper configured to limit movement of the base member of the rear derailleur relative to the base member stopper plate. The biasing force adjustment member includes a second adjustment part, and an engagement part configured to engage a biasing element of the base member of the rear derailleur. The biasing force adjusting element is movably attached to the first adjustment part with the biasing force adjusting element being oriented to contact and move the second adjustment part of the biasing force adjustment member to selectively set a relative angular position of the biasing force adjustment member relative to the base member stopper plate about a rotational axis of the base member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
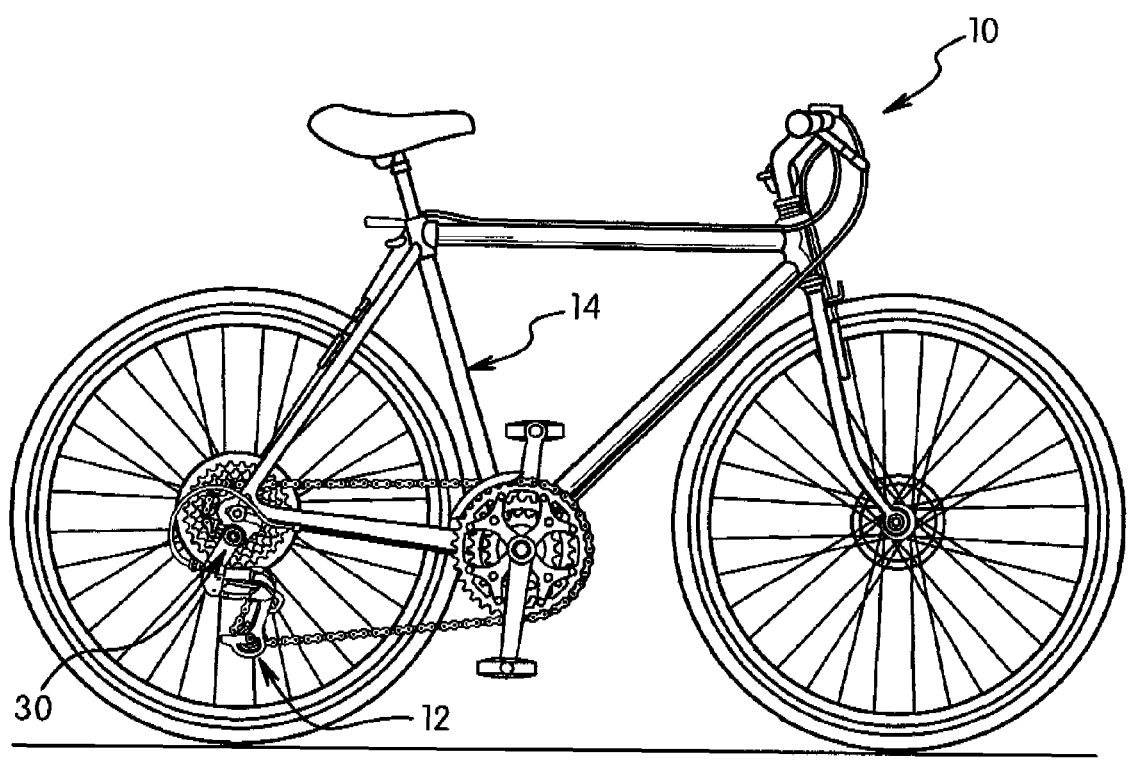
FIG. 1 is a side elevational view of a bicycle showing a rear derailleur in accordance with one embodiment of the present invention.
Figure 2:
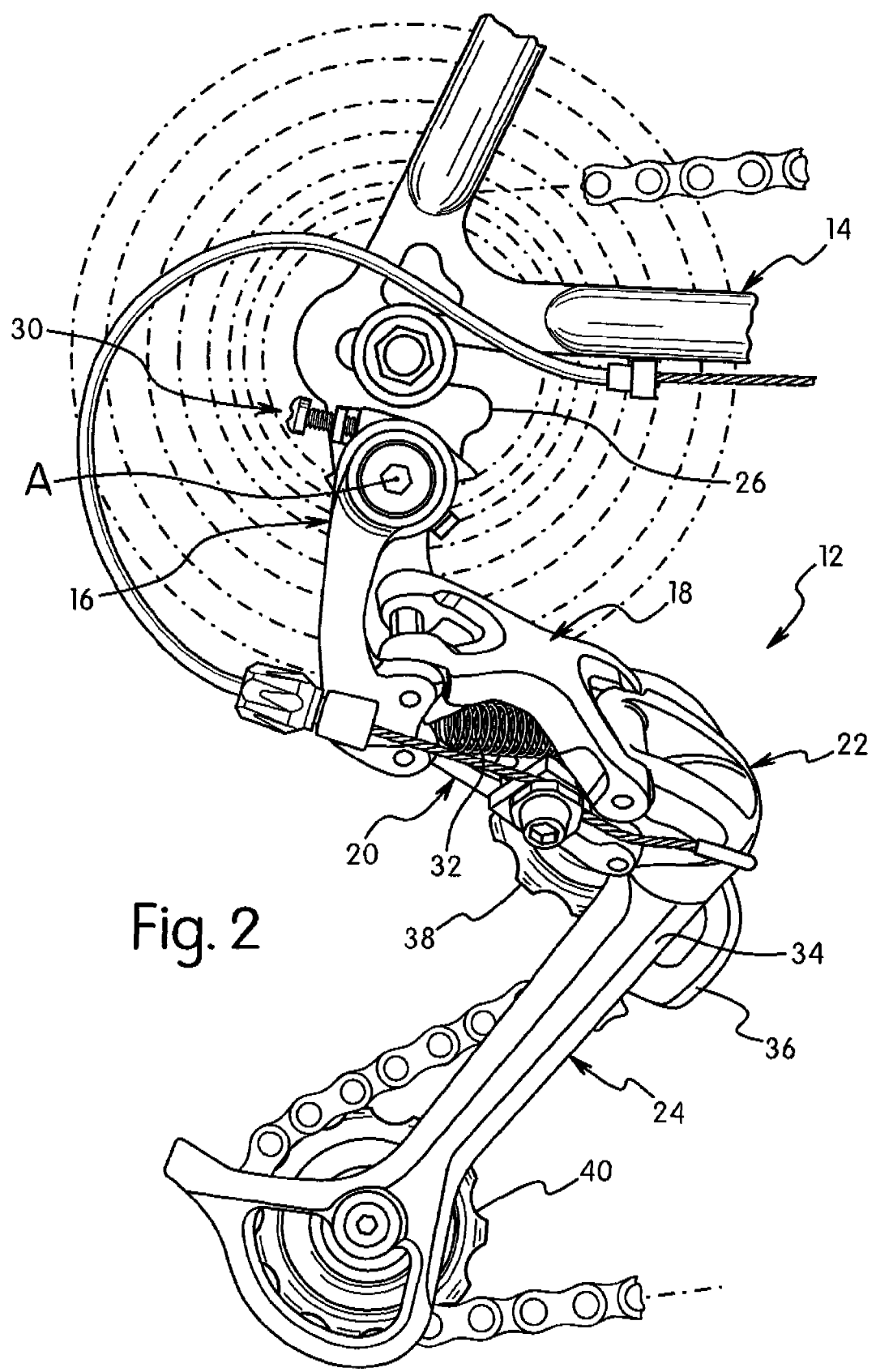
FIG. 2 is an enlarged outboard elevational view of the rear derailleur with the bicycle base member adjustment assembly in accordance with the illustrated embodiment of the present invention.
Figure 3:
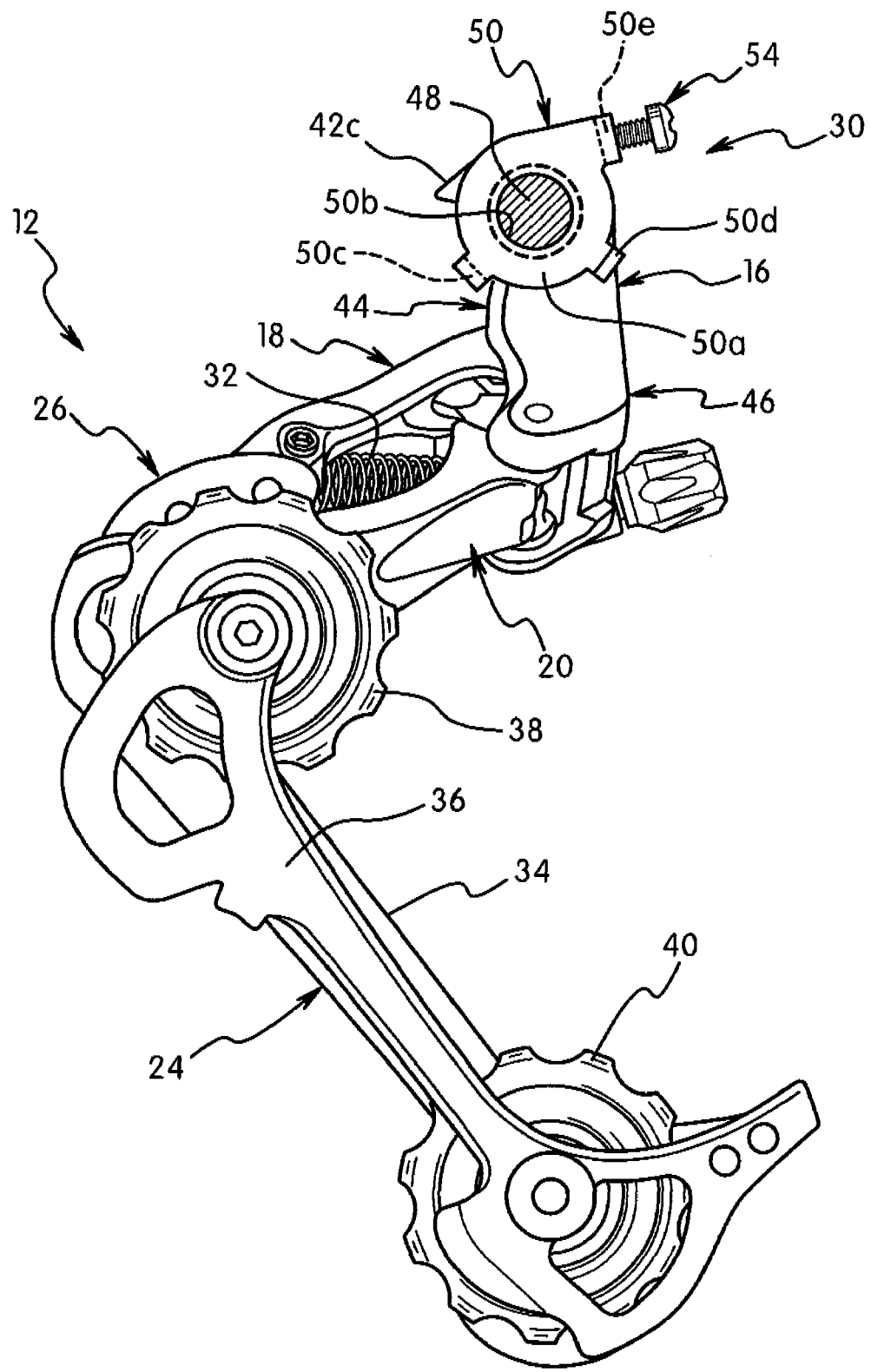
FIG. 3 is an enlarged inboard side elevational view of the rear derailleur with the bicycle base member adjustment assembly in accordance with the illustrated embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1-5, a bicycle 10 is illustrated that is equipped with a bicycle rear derailleur 12 in accordance with a first embodiment of the present invention. As shown in FIGS. 2-5, the bicycle 10 has a frame 14 in which the rear derailleur 12 is secured thereto. The rear derailleur 12 basically includes a base member 16, a pair of links 18 and 20 forming a linkage assembly and a movable member 22 with a chain guide 24 pivotally mounted to the movable member 22. The rear derailleur 12 is movably secured to a rear mounting portion 26 of the frame 14 of the bicycle 10.

In particular, as explained below and as best seen in FIGS. 6 to 10, the rear derailleur 12 is attached to the rear mounting portion 26 of the frame 14 for limited relative rotational movement about a rotational axis A. The base member 16 is biased in the clockwise direction about the rotational axis A by a biasing element 28 (shown in FIGS. 8 and 9) that is provided in the base member 16. The rear derailleur 12 is also provided with a bicycle base member adjustment assembly 30 that limits the rotational movement of the rear derailleur 12 about the rotational axis A as well as adjusts a biasing force of the biasing element 28 of the base member 16 without changing the end stopping positions of the rotational movement of the base member 16.

Figure 8:
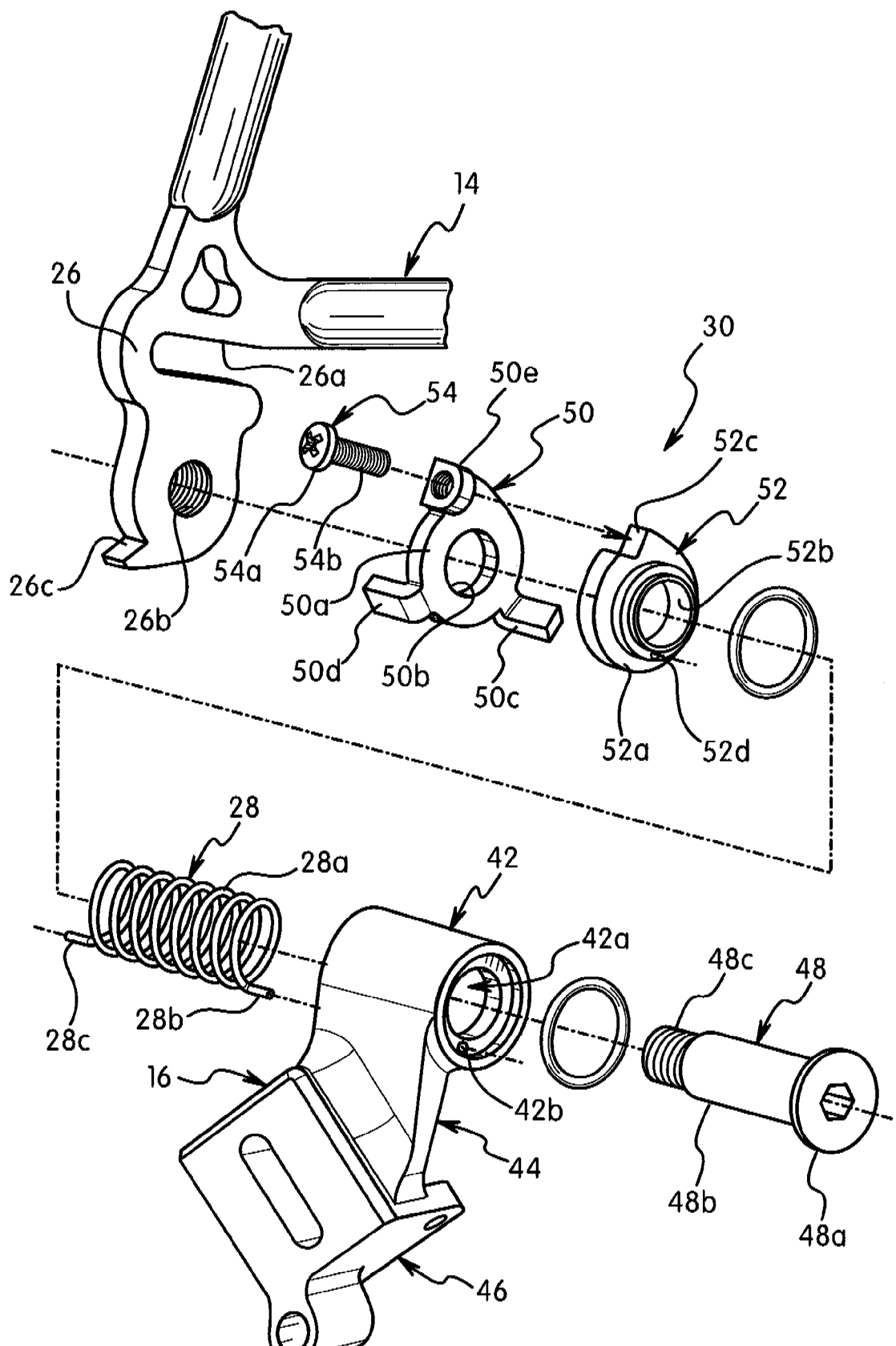
FIG. 8 is an exploded perspective view of view of the bicycle base member adjustment assembly and the base member in accordance with the illustrated embodiment of the present invention.
Figure 9:
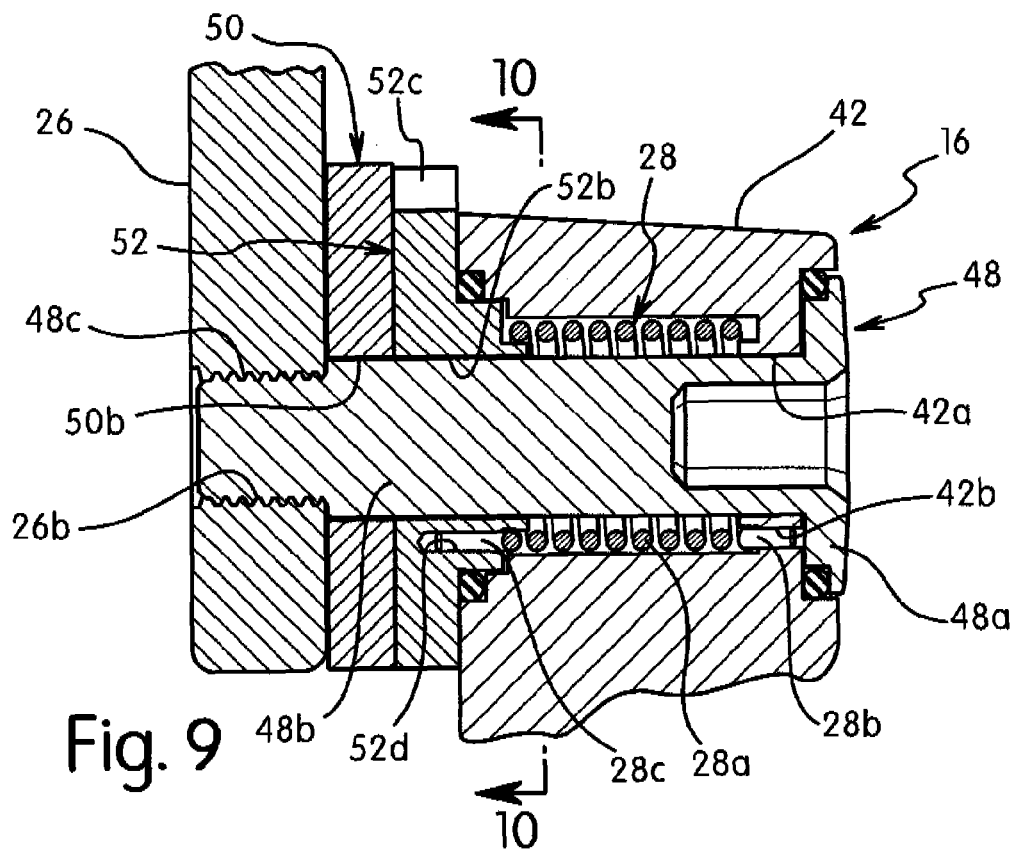
FIG. 9 is a cross sectional view of the base member mounted to the bicycle frame in accordance with the illustrated embodiment of the present invention.

As shown in FIG. 8, the rear mounting portion 26 is located on the right side of the frame end 14. The rear mounting portion 26 includes a mounting slot 26a, a threaded mounting hole 26b and a positioning abutment 26c. The mounting slot 26a is used for attaching a hub axle of a rear wheel to the frame 14, while the threaded mounting hole 26b is used for mounting the rear derailleur 12 to the frame 14. The positioning abutment 26c is formed by a tip of a protruding part of the rear mounting portion 26. The positioning abutment 26c cooperates with the bicycle base member adjustment assembly 30 to limit counterclockwise rotation of the rear derailleur 12 in a manner described below.

Basically, the rear derailleur 12 is conventional rear derailleur in which an inner wire of a Bowden cable assembly is coupled to one of the links 18 and 20 (e.g., the inner wire coupled to the link 20 in the illustrated embodiment) to move the movable member 22 and the chain guide 24 laterally relative to the base member 16. A coil spring 32 is connected to diagonally opposite pivot shafts so that links 18 and 20 are biased together. The chain guide 24 basically includes a pair of chain cage plates 34 and 36, an idler pulley 38 and a tension pulley 40. Generally speaking, the rear derailleur 12 can be any rear derailleur that has a biasing member for biasing the rear derailleur 12 about its mounting (rotational) axis. Thus, the parts of the rear derailleur 12 will not be discussed or illustrated in detail herein, except for those parts that relate to the bicycle base member adjustment assembly 30 of the present invention.

Figure 6:
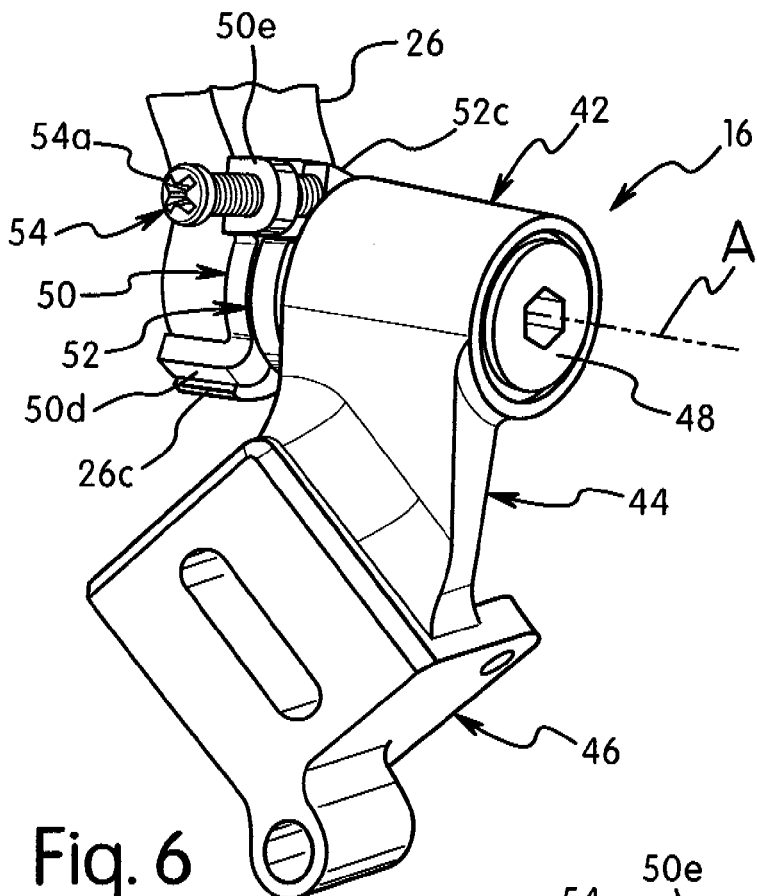
FIG. 6 is an enlarged rear perspective view of the bicycle base member adjustment assembly and the base member in accordance with the illustrated embodiment of the present invention.
Figure 7:
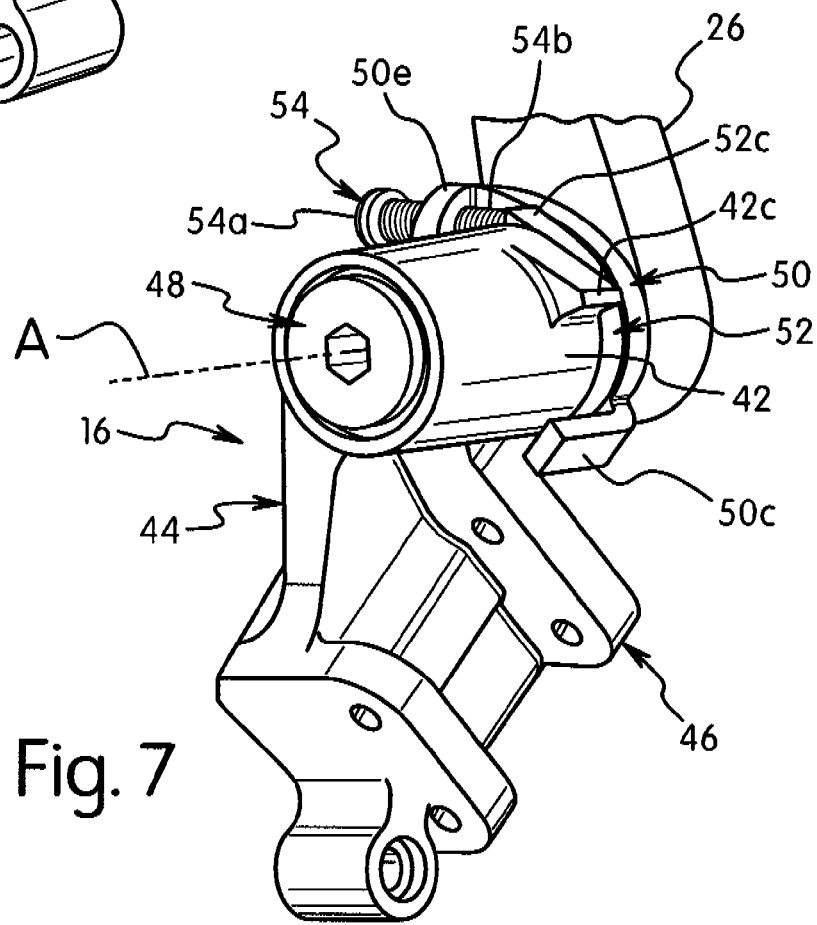
FIG. 7 is an enlarged front perspective view of the bicycle base member adjustment assembly and the base member in accordance with the illustrated embodiment of the present invention.

As shown in FIGS. 6 to 8, the base member 16 includes a cylindrical housing part 42, an arm part 44 extending radially from the housing part 42, and a link support part 46 disposed at an end section of the arm part 44 that is opposite the housing part 42. The housing part 42 includes a through hole 42a dimensioned to house the biasing member 28 and to receive a mounting axle 48 therethrough. The mounting axle 48 is a mounting bolt that includes a collar or head portion 48a and a shaft portion 48b with an externally threaded portion 48c. The threaded portion 48c of the mounting axle 48 is threaded into the threaded mounting hole 26b of the rear mounting portion 26 to secure the rear derailleur 12 to the frame 14. The biasing member 28 is preferably a torsion spring that has a coiled portion 28a disposed around the shaft portion 48b of the mounting axle 48, a first free end 28b disposed in a hole 42b of the housing part 42 and a second free end 28c that is coupled to the bicycle base member adjustment assembly 30 as explained below. Thus, the rear derailleur 12 is biased in the clockwise direction about the rotational axis A by the biasing element 28 relative to the bicycle base member adjustment assembly 30. The exterior surface of the housing part 42 is provided with a positioning projection 42c. The positioning projection 42c cooperates with the base member adjustment assembly 30 to limit rotational of the rear derailleur 12 about the rotational axis A as explained below.

Referring now to FIG. 8, the bicycle base member adjustment assembly 30 basically includes a base member stopper plate 50, a biasing force adjustment member 52 and a biasing force adjusting element 54. The biasing force adjusting element 54 is operatively coupled between the base member stopper plate 50 and the biasing force adjustment member 52 to selectively set a relative angular position of the biasing force adjustment member 52 relative to the base member stopper plate 50 about the rotational axis A of the base member 16 for adjusting the biasing or urging force of the biasing member 28. In the illustrated embodiment, the biasing force adjusting element 54 includes a bolt that is movably coupled to the base member stopper plate 50 and that is oriented to contact and move the biasing force adjustment member 52 relative to the base member stopper plate 50 about the rotational axis of the base member 16 for adjusting the biasing or urging force of the biasing member 28.

The base member stopper plate 50 is preferably a hard rigid member such as a metal member. The base member stopper plate 50 can be formed, for example, by pressing a steel sheet. In this embodiment, the base member stopper plate 50 is disposed between the rear mounting portion 26 of the frame 14 and the biasing force adjustment member 52. The base member stopper plate 50 basically includes an annular part 50a that forms a mounting opening 50b, a base member stopper 50c, a frame contacting part 50d and a first adjustment part 50e. The mounting opening 50b is dimensioned to receive the mounting axle 48 such that the base member stopper plate 50 can rotate around the mounting axle 48.

The base member stopper 50c is selectively engageable with the positioning projection 42c and the arm part 44 of the base member 16 to limit movement of the base member 16 relative to the base member stopper plate 50 when the rear derailleur 12 rotates about the mounting axle 48. The base member stopper 50c of the base member stopper plate 50 is preferably a tab that extends in an axial direction that is opposite of the frame contacting part 50d of the base member stopper plate 50. In other words, the base member stopper 50c is a portion of base member stopper plate 50 that extends radially outward from the annular part 50a and then extends in a direction substantially parallel to the rotational axis A away from the frame 14 toward the base member 16 to form a movement limiting member. The base member stopper 50c contacts the positioning projection 42c to limit rotational movement of the rear derailleur 12 in the clockwise direction about the rotational axis A, and contacts the arm part 44 of the base member 16 to limit rotational movement of the rear derailleur 12 in the counterclockwise direction about the rotational axis A. When the chain is installed on the rear derailleur 12, a force will be applied against the biasing force of the biasing member 28 such that the base member stopper 50c normally is spaced between the positioning projection 42c and the arm part 44.

Figure 10:
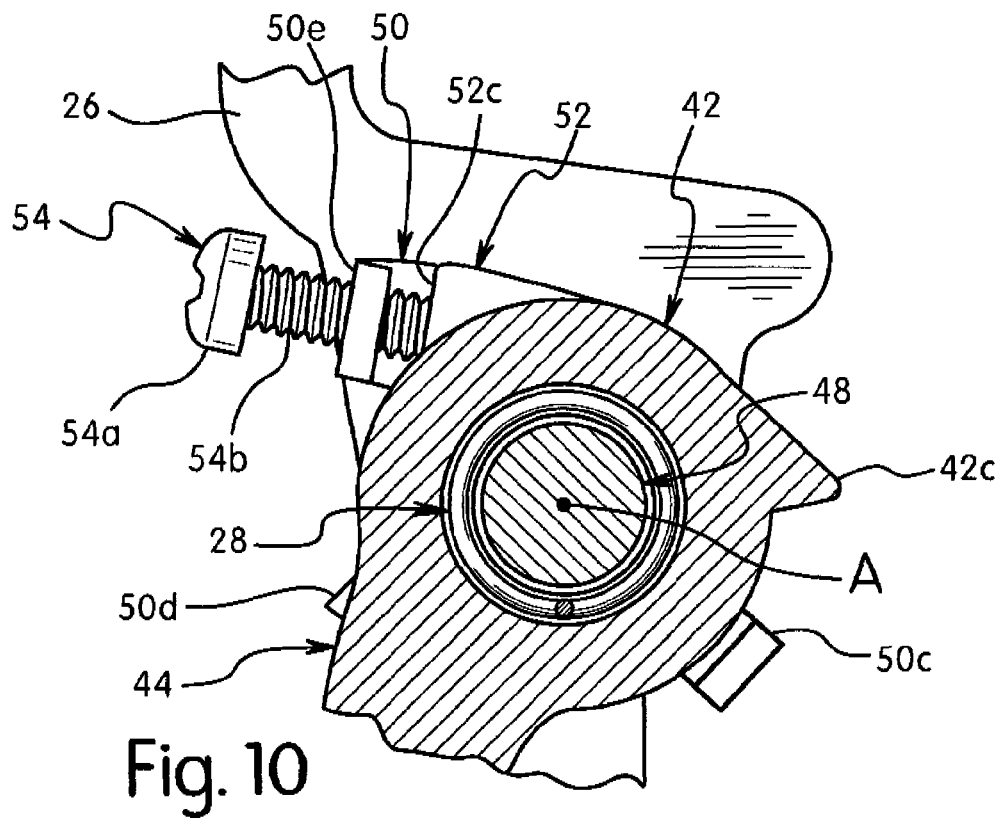
FIG. 10 is an enlarged outboard elevational view of the bicycle base member adjustment assembly and the base member in accordance with the illustrated embodiment of the present invention.

The frame contacting part 50d is configured to contact the bicycle frame 14 to limit rotational movement of the base member stopper plate 50 relative to the bicycle frame 14. The frame contacting part 50d of the base member stopper plate 50 is preferably a tab that extends in an axial direction from the annular part 50a. Thus, the frame contacting part 50d preferably extends in a direction substantially parallel to the rotational axis A toward the frame 14 so as to engage the positioning abutment 26c of the rear mounting portion 26 on the frame 14 as seen in FIGS. 6 and 10. The frame contacting part 50d normally contacts the positioning abutment 26c of the rear mounting portion 26 due to the biasing member 28 urging the biasing force adjustment member 52 in the counterclockwise direction about the rotational axis A and the tension in the chain applying an overall force to the rear derailleur 12 in the counterclockwise direction about the rotational axis A. Thus, the frame contacting part 50d prevents counterclockwise rotation of the base member stopper plate 50 relative to the rear mounting portion 26 of the frame 14. Also since the base member 16 is biased in the clockwise direction about the rotational axis A by the biasing force of the biasing element 28, contact between the base member stopper 50c and the positioning projection 42c prevents unlimited clockwise rotation of the base member 16 relative to the base member stopper plate 50.

The first adjustment part 50e is preferably an axially extending tab with a threaded aperture or hole that threadedly receives the biasing force adjusting element (bolt) 54. Thus, the first adjustment part 50e preferably extends in a direction substantially parallel to the rotational axis A away from the frame 14 so as to align with the biasing force adjustment member 52 as seen in FIGS. 6 to 8.

The biasing force adjustment member 52 is preferably a hard rigid member such as a metal member. The biasing force adjustment member 52 can be formed, for example, by pressing a steel sheet. The biasing force adjustment member 52 basically includes an annular part 52a that forms a mounting opening 52b, a second adjustment part 52c and an engagement part 52d.

The mounting opening 52b is dimensioned to receive the mounting axle 48 such that the biasing force adjustment member 52 can rotate around the mounting axle 48. The second adjustment part 52c of the biasing force adjustment member 52 has an abutment surface that faces in a circumferential direction about the rotational axis of the base member 16. The free end of the biasing force adjusting element (bolt) 54 contacts the abutment surface of the second adjustment part 52c of the biasing force adjustment member 52 to selectively rotate the biasing force adjustment member 52 on the mounting axle 48 upon rotation of the biasing force adjusting element (bolt) 54.

Figure 4:
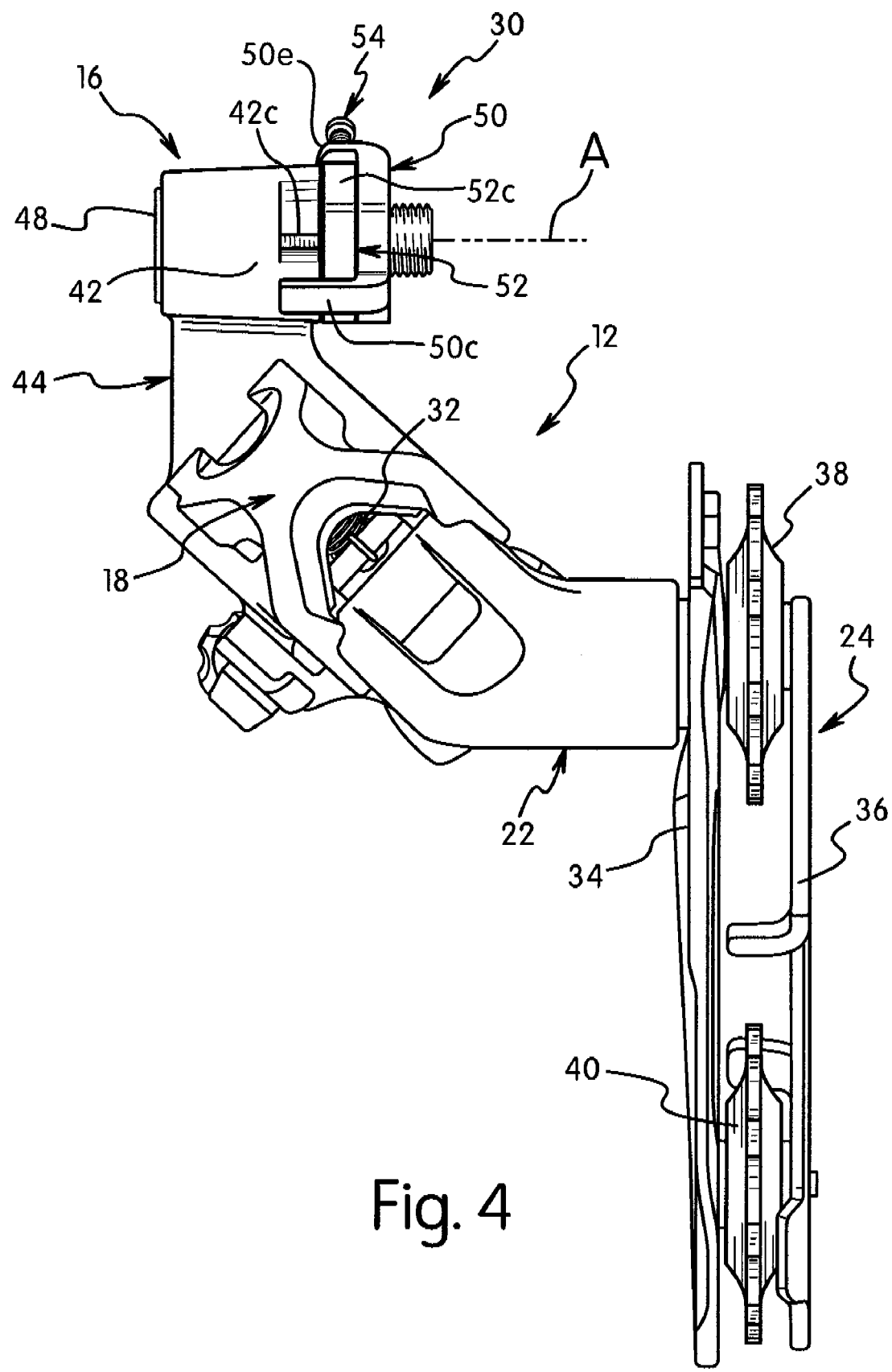
FIG. 4 is an enlarged front elevational view of the rear derailleur with the bicycle base member adjustment assembly in accordance with the illustrated embodiment of the present invention.
Figure 5:
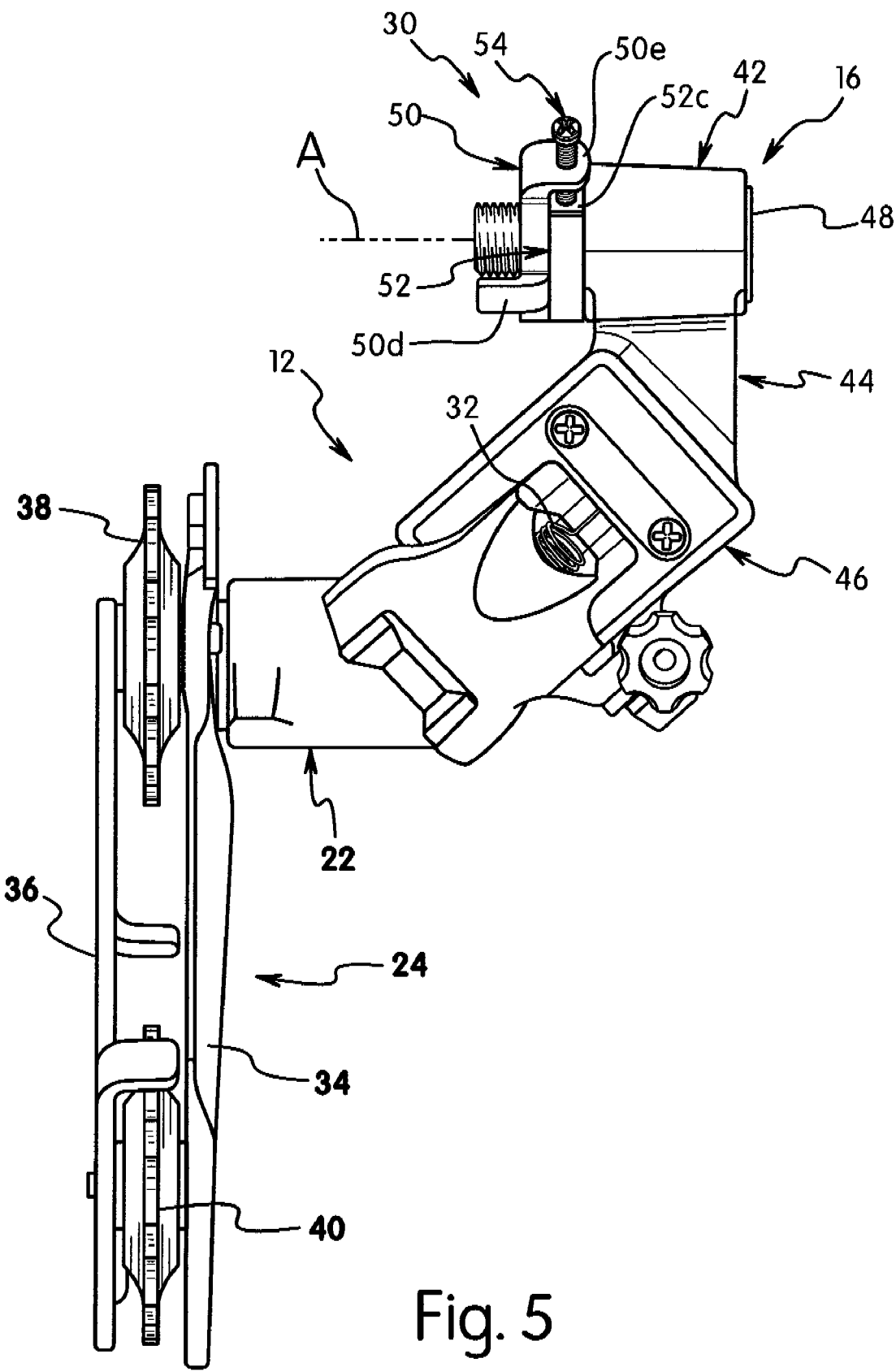
FIG. 5 is an enlarged rear elevational view of the rear derailleur with the bicycle base member adjustment assembly in accordance with the illustrated embodiment of the present invention.

The engagement part 52d is coupled to the biasing element 28 of the base member 16 such that rotation of the biasing force adjustment member 52 on the mounting axle 48 causes the biasing force of the biasing element 28 to be adjusted. Preferably, the engagement part 52d of the biasing force adjustment member 52 includes a bore formed in an axial face of the annular part 52a of the biasing force adjustment member 52 to retain a part of the biasing element 28 of the base member 16 of the rear derailleur 12. In particular, the second end 28c of the biasing member (coiled torsion spring) 28 is fixed to the biasing force adjustment member 52, while the first end 28b of the biasing member (coiled torsion spring) 28 is fixed to base member 16. The biasing member (coiled torsion spring) 28 is rotatably supported around mounting axle 48 in a slightly compressed and twisted state so that base member 16 is biased in a clockwise direction relative to the biasing force adjustment member 52 when viewed from the outbound side of the rear derailleur 12. Thus, the biasing force adjustment member 52 is biased in a counterclockwise direction relative to the frame 14 when viewed from the outbound side of the rear derailleur 12. As shown in FIG. 4, the biasing member (coiled torsion spring) 28 is fitted within the through hole 42a such that one side abuts against a smaller diameter portion of the through hole 42a.

The biasing force adjusting element 54 is movably attached to the first adjustment part 50e with the biasing force adjusting element 54 being oriented to contact and move the second adjustment part 52c of the biasing force adjustment member 52 to selectively set a relative angular position of the biasing force adjustment member 52 relative to the base member stopper plate 50 about the rotational axis A of the base member 16. As mentioned above, the biasing force adjusting element 54 is preferably a bolt that has a head portion 54a and a threaded shaft portion 54b. The free end of the threaded shaft portion 54b contacts the abutment surface of the second adjustment part 52c of the biasing force adjustment member 52 to selectively rotate the biasing force adjustment member 52 on the mounting axle 48 upon rotation of the biasing force adjusting element (bolt) 54. When the biasing force adjusting element (bolt) 54 is rotated in the clockwise direction, the biasing force adjustment member 52 is rotated on the mounting axle 48 in the clockwise direction about the rotational axis A of the base member 16 against the biasing force of the biasing member 28. If the biasing force adjusting element (bolt) 54 is rotated in the counterclockwise direction, then the biasing force adjustment member 52 is rotated on the mounting axle 48 in the counterclockwise direction about the rotational axis A of the base member 16.

The bicycle base member adjustment assembly 30 regulates the range of rotational movement of the base member 16 in the counterclockwise direction to prevent the chain guide 24 and the movable member 22 from contacting the frame (e.g., the chain stay 20) when the base member 16 rotates counterclockwise under severe riding conditions. In this embodiment, the rider simply turns biasing force adjusting element (bolt) 54 to adjust the biasing force of the biasing member 28 while maintaining a proper rotational relationship between the base member 16 and the frame 14. This is done without changing the relative rotational positions of the base member 16 and the base member stopper plate 50 with respect to the frame 14.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle base member adjustment assembly for a base member of a rear derailleur, the bicycle base member adjustment assembly comprising:
a base member stopper plate including an annular part with a mounting opening, an adjustment tab extending from the annular part in a first axial direction with respect to a center axis of the mounting opening, a frame contacting tab extending from the annular part in a second axial direction that is opposite to the first axial direction for contacting a bicycle frame to limit movement of the base member stopper plate relative to the bicycle frame when the bicycle base member adjustment assembly is mounted between the rear derailleur and the bicycle frame, and a stopper tab extending from the annular part in the first axial direction with respect to the center axis of the mounting opening to limit movement of the base member of the rear derailleur relative to the base member stopper plate when the bicycle base member adjustment assembly is mounted between the rear derailleur and the bicycle frame;
a biasing force adjustment member including an annular part with a mounting opening, an abutment surface that faces in a circumferential direction with respect to a center axis of the mounting opening of the biasing force adjustment member and an engagement part configured to engage a biasing element of the base member of the rear derailleur, the biasing force adjustment member being rotatably disposed with respect to the base member stopper plate; and
a bolt disposed in a threaded aperture of the adjustment tab with a free end of the bolt contacting the abutment surface of the biasing force adjustment member to selectively set a relative angular position of the biasing force adjustment member relative to the base member stopper plate about the center axis of the mounting opening of the base member.

2. A bicycle derailleur comprising:
a base member including a housing part, a biasing member disposed in the housing part, a mounting axle and a positioning projection disposed on the housing part;
a linkage assembly movably coupled to the housing part of the base member;
a movable member with a chain guide coupled to the linkage assembly; and
a bicycle base member adjustment assembly including
a base member stopper plate including an annular part with a mounting opening receiving the mounting axle therethrough, an adjustment tab extending from the annular part in a first axial direction with respect to a center axis of the mounting opening, a frame contacting tab extending from the annular part in a second axial direction that is opposite to the first axial direction for contacting a bicycle frame to limit movement of the base member stopper plate relative to the bicycle frame when the bicycle base member adjustment assembly is mounted between the rear derailleur and the bicycle frame, and a stopper tab extending from the annular part in the first axial direction with respect to the center axis of the mounting opening and selectively engaging the positioning projection to limit movement of the base member relative to the base member stopper plate;
a biasing force adjustment member including an annular part with a mounting opening receiving the mounting axle therethrough, an abutment surface that faces in a circumferential direction with respect to a center axis of the mounting opening of the biasing force adjustment member and an engagement part coupled to the biasing element of the base member, the biasing force adjustment member being rotatably disposed with respect to the base member stopper plate; and
a bolt disposed in a threaded aperture of the adjustment tab with a free end of the bolt contacting the abutment surface of the biasing force adjustment member to selectively set a relative angular position of the biasing force adjustment member relative to the base member stopper plate about a rotational of the mounting axle.

* * * * *